United States Patent [19]

Maier et al.

[11] Patent Number: 4,852,536
[45] Date of Patent: Aug. 1, 1989

[54] TRIGGER SYSTEM FOR IGNITION SYSTEM FOR INTERNAL COMBUSTION ENGINES

[75] Inventors: Gerhard A. Maier, Mundelein; David L. Enlow, Wadsworth; Paul T. Ng, Park City, all of Ill.

[73] Assignee: Outboard Marine Corporation, Waukegan, Ill.

[21] Appl. No.: 131,858

[22] Filed: Dec. 11, 1987

[51] Int. Cl.[4] .......................... F02P 5/15; F02P 7/067
[52] U.S. Cl. ..................................... 123/414; 123/643
[58] Field of Search ........................ 123/414, 617, 643

[56] References Cited

U.S. PATENT DOCUMENTS

| | | |
|---|---|---|
| 3,464,397 | 9/1969 | Burson . |
| 3,593,063 | 7/1971 | Cavil . |
| 3,669,086 | 6/1972 | Beuk et al. . |
| 3,723,844 | 3/1973 | Cavil . |
| 3,828,753 | 8/1974 | Reddy . |
| 3,842,299 | 10/1974 | Lombard . |
| 3,855,516 | 12/1974 | Fairchild . |
| 3,863,616 | 2/1975 | Wood . |
| 3,871,348 | 3/1975 | Cavil . |
| 3,875,915 | 4/1975 | Anderson et al. . |
| 3,942,501 | 3/1976 | Byles . |
| 3,955,550 | 5/1976 | Carlsson . |
| 3,998,198 | 12/1976 | Jereb . |
| 4,007,724 | 2/1977 | Mura . |
| 4,074,665 | 2/1978 | Patis . |
| 4,176,643 | 12/1979 | Beeghly . |
| 4,200,078 | 4/1980 | Cavil et al. . |
| 4,216,756 | 8/1980 | Mura . |
| 4,269,152 | 5/1981 | VanSiclen, Jr. . |
| 4,346,690 | 8/1982 | Anderson . |
| 4,373,486 | 2/1983 | Nichols et al. ............... 123/643 X |
| 4,403,527 | 9/1983 | Mohl et al. ................... 74/872 X |
| 4,418,677 | 12/1983 | Hofmann . |
| 4,558,673 | 12/1985 | Mackie ........................ 123/643 X |
| 4,596,227 | 6/1986 | Hashizume ................... 123/643 |
| 4,653,315 | 3/1987 | Ament et al. . |
| 4,664,082 | 5/1987 | Suzuki . |

FOREIGN PATENT DOCUMENTS 104568  8/1980  Japan .............................. 123/643

Primary Examiner—Tony M. Argenbright
Attorney, Agent, or Firm—Welsh & Katz, Ltd.

[57] ABSTRACT

A trigger system for spark-fired internal combustion engines includes a plurality of magnets mounted in a structure that rotates in a timed relationship with the engine. One magnet is provided for each cylinder in the engine. All of the magnets except one have the same pole face exposed to couple inductively with a sensing coil, while the remaining magnet has an exposed pole of opposite polarity. The sensing coil is doubly wound and the resulting two coils are connected in opposite senses. The outputs of the two coils are taken to a decoding unit which produces an output of one pulse per magnet. Those pulses are substantially identical, regardless of magnet polarity, and are used to fire the spark plugs at the appropriate times. The decoding unit also produces a unique pulse which identifies the magnet of opposite polarity. That pulse is used to identify a selected cylinder in the engine, such as the No. 1 cylinder. In this manner, the firing of all of the spark plugs, and the identification of the cylinders, are controlled using a single magnet for each cylinder.

33 Claims, 4 Drawing Sheets

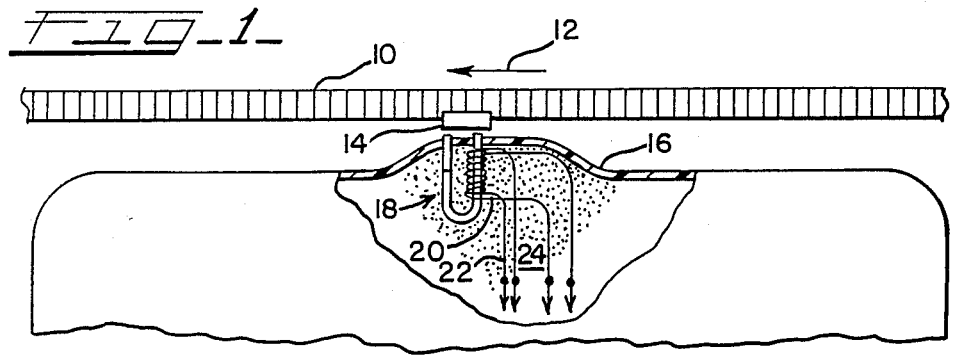
FIG-1-
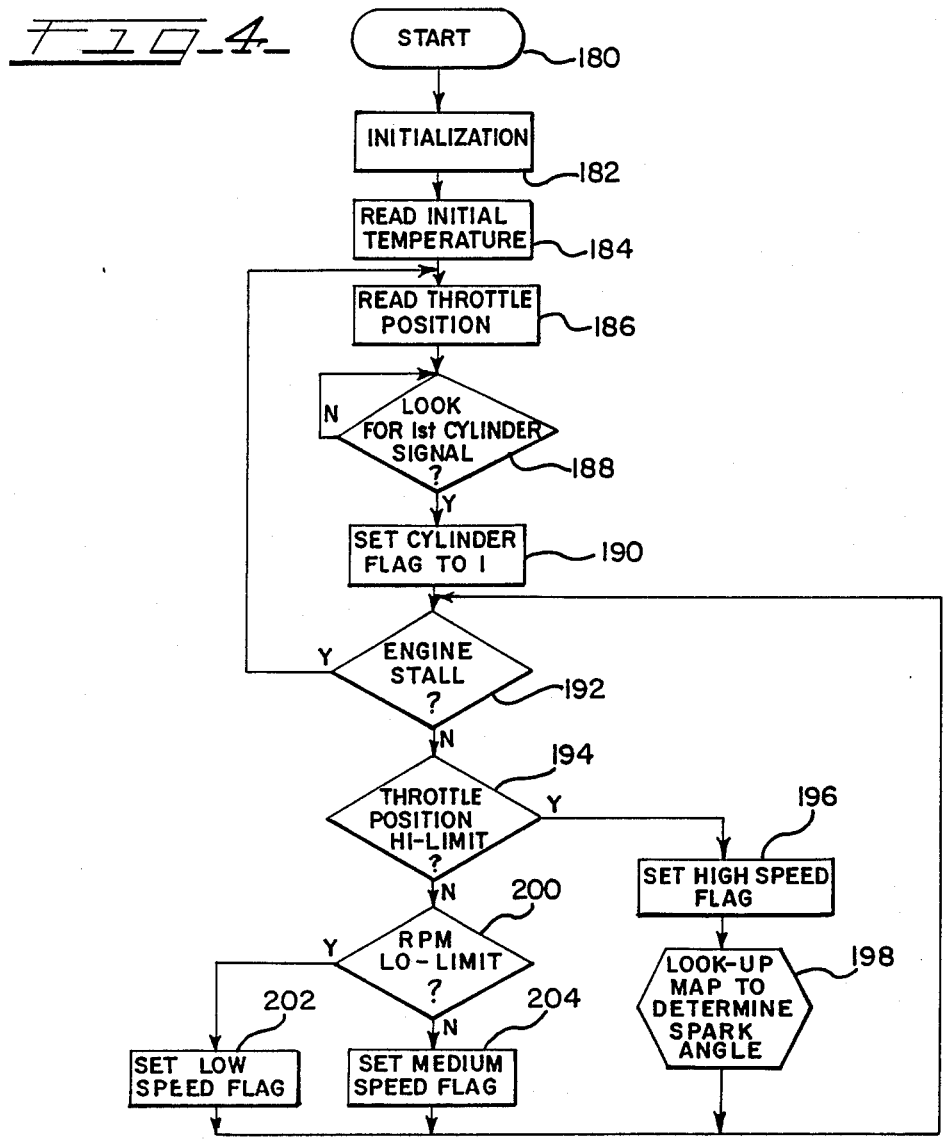
FIG-4-

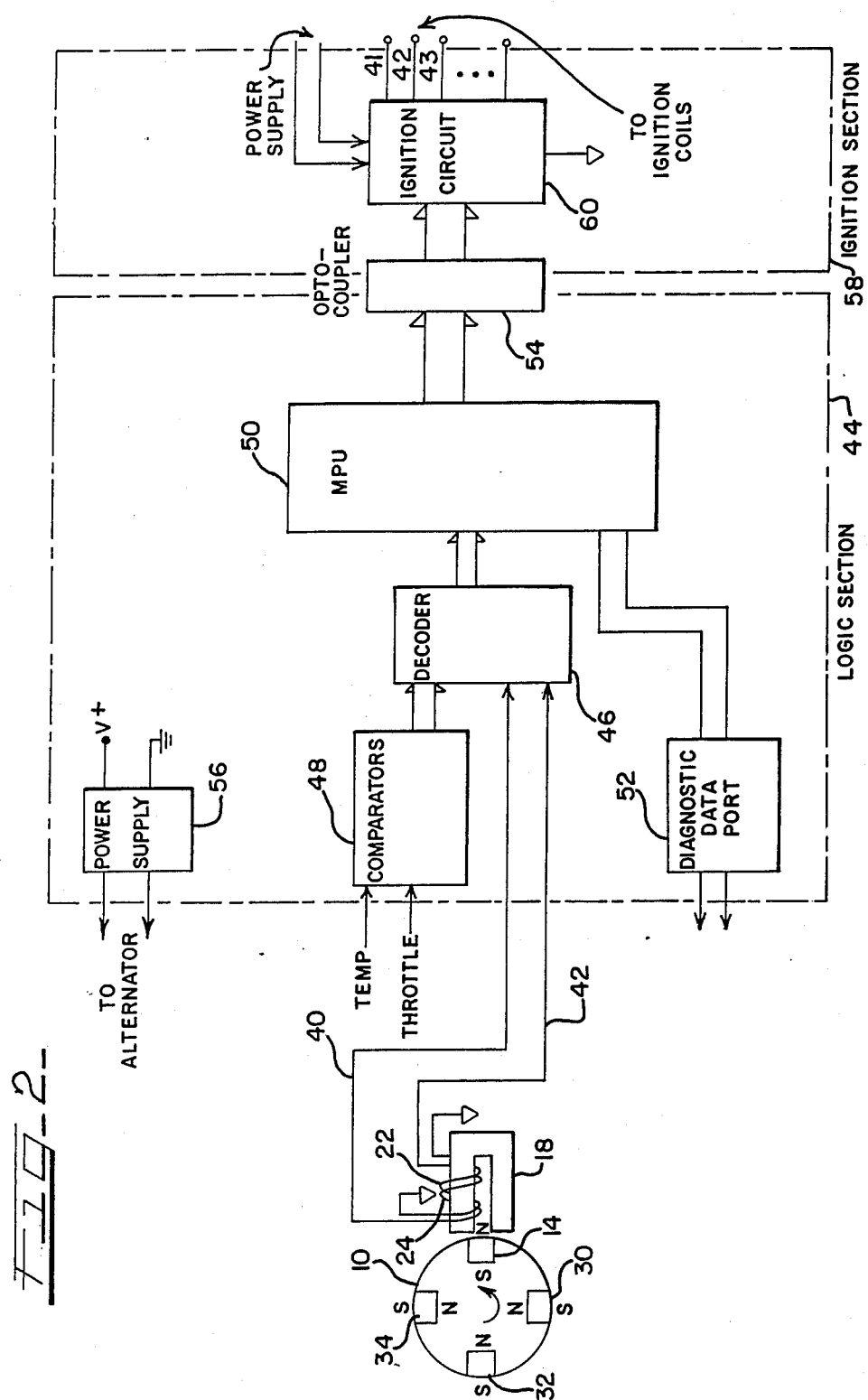

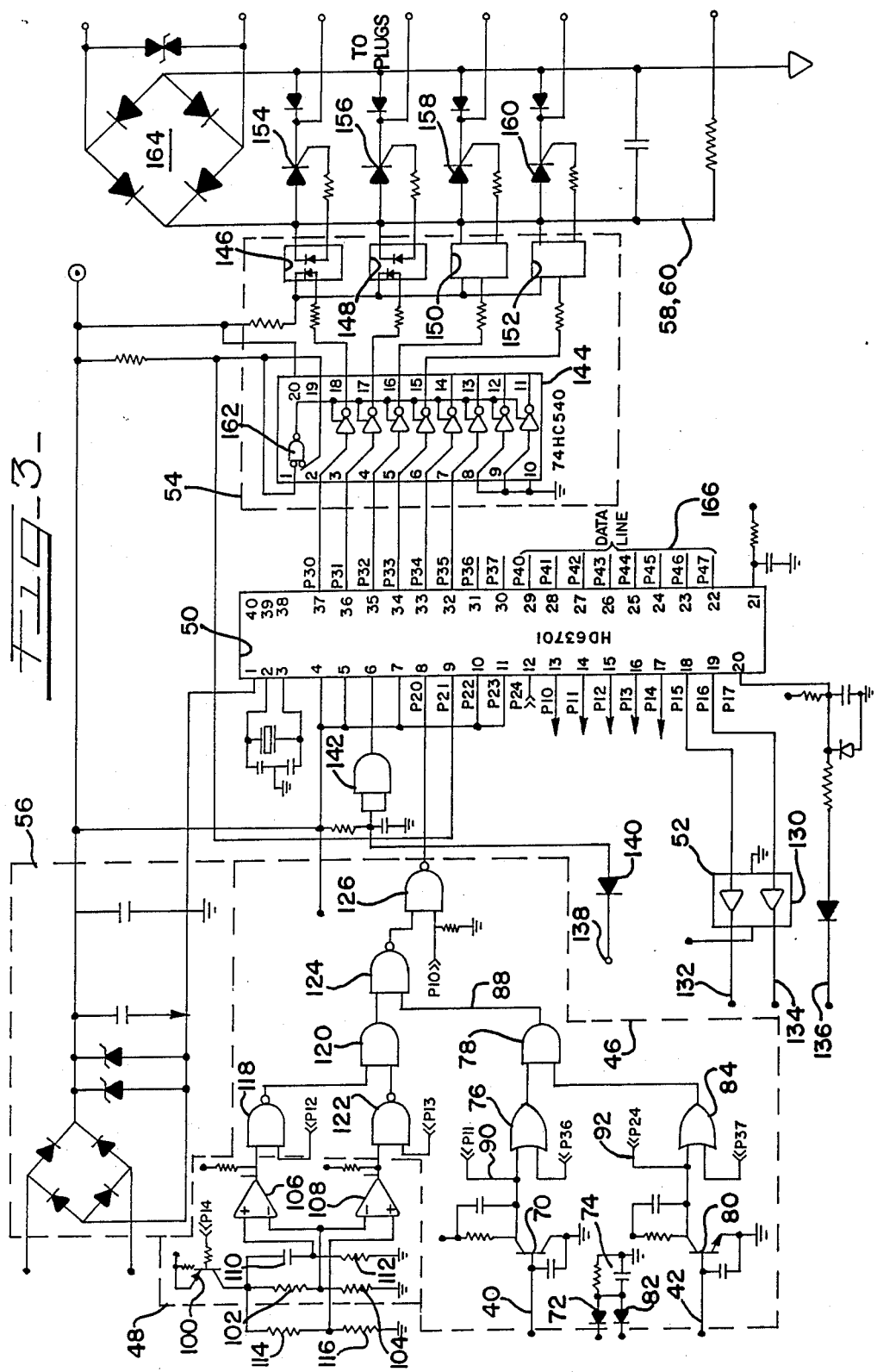

TRIGGER SYSTEM FOR IGNITION SYSTEM FOR INTERNAL COMBUSTION ENGINES

BACKGROUND OF THE INVENTION

This invention relates to the triggering of ignition pulses in spark-fired internal combustion engines. It is especially adapted for use in two-stroke outboard marine engines.

A necessary requirement of operation for spark-fired internal combustion engines is a spark that is delivered to the right cylinder at the right time to ignite the combustion of a mixture of fuel and air. For many years, such a spark was provided by a set of breaker points which interrupted the current flow in an inductor that represented a primary winding of a step-up transformer. The high-voltage impulse that was thus generated was distributed to cylinders by a rotating mechanical switch that effected a direct electrical connection individually to each cylinder. The timing sequence was thus the result of a wiring sequence, and the operating necessity for varying the timing of a spark with respect to top dead center (TDC) of the pistons in the cylinders was accomplished by making the breaker and switching arrangement rotatable.

The system described above led to the development of radio-frequency interference as a result of the spark produced at the breaker points by interrupting the flow of current. The breaker points themselves were subject to pitting as a result of the interruption, and the rotating switches that distributed current to the cylinders were also subject to corrosion that led to insufficient sparking and a need for repairs.

An early attempt at improving the operating of ignition systems involved replacing the breaker points with a silicon-controlled rectifier (SCR) to provide arcless switching. Other attempts have included using an alternator to time the spark as well as generate energy for it.

Two patents showing ways of generating a spark without the use of breaker points are U.S. Pat. No. 3,669,086, "Solid State Ignition System," and U.S. Pat. No. 3,942,501, "Timing Circuit for flywheel Ignition System." U.S. Pat. No. 3,669,086 generates high-energy pulses for ignition by attaching be permanent magnet to the flywheel and rotating the permanent magnet past a charge-trigger coil assembly to charge a capacitor. The trigger coil then receives an impulse from the rotating magnet to trigger the discharge of the capacitor into ignition coils. The magnet that rotates with the flywheel is the principal source of energy for the spark, in addition to controlling the timing. In contrast, U.S. Pat. No. 3,942,501 produces individual triggering impulses for each of a pair of cylinders by having a fixed coil for each pair of cylinders. Each fixed coil has an armature that spans a segment of the rotating magnet structure of an alternator that has exposed magnet faces producing one alteration of sign in each direction once per revolution. The signal is used only for triggering, and not as the source of ignition energy. The systems of both of the patents cited above have the disadvantage that they are not readily adapted to control ignition for a large number of cylinders. The '501 patent teaches two cylinders, for which it uses seven magnet segments, and triggering more cylinders would require an increased number of magnet segments. The '086 patent teaches the firing of four spark plugs, but they are fired in groups of two, with each spark plug intended to fire once per cycle in the power stroke and once per cycle in the exhaust stroke of a four-stroke cycle. Each of these modes of operation represents a disadvantage that is overcome by the circuit of the present invention.

A third way of avoiding the use of breaker points to generate and control ignition impulses is disclosed and claimed in U.S. Pat. No. 4,269,152, entitled "Breakerless Pulse Distribution System and Opto-Electrical Distributor Therefor." In this patent, a shutter in the form of a cup with an opening is caused to rotate about an array of phototransistors. A shutter in the cup permits the coupling of light from a light-emitting diode (LED) to the phototransistor to initiate the timing of a spark. This patent teaches the advantages of pulsed LEDs, in contrast to the disadvantages of using such a timed shutter With a continuous light source. However, the use of a rotating-cup shutter requires a mechanical adjustment to change the ignition angle.

In each of the patents described above, each cylinder receives an impulse directing the spark from a dedicated line. A simpler ignition system can be achieved if one line is caused to have a firing impulse for each cylinder, which is the processed in an electronic module to distribute the Associated spark to the proper cylinder. However, such a system requires some unambiguous method of identifying a particular cylinder so that the timing of the spark is not changed by one or more entire spark intervals. This is characterized as selecting a number one cylinder.

Proper operation of an internal combustion engine requires variation in the timing of the spark with respect to top dead center (TDC), which is normally taken as the reference for timing a spark. Timing that is optimum to start an engine is typically different from the optimum timing for a running engine. A cold engine may call for a different spark timing from the setting required when the engine is warm. In addition, it is also desirable to increase the idling speed of a cold engine to minimize the chances of stalling the engine. For any given speed of an engine, the optimum timing is typically a function of the load on the engine. One way of sensing the load on the engine is to detect the throttle position. The changes in timing that are described above have generally been accomplished in the past using a mechanical spark distribution system in which the spark timing as changed mechanically.

It is an object of the present invention to provide a better means for timing sparks in an internal combustion engine that is spark-ignited.

It is an object of the present invention to provide an improved ignition system having a single line for input into an electronic ignition system in which the single line carries a timing pulse for each cylinder.

It is a further object of the present invention to provide an improved means of identifying a particular cylinder to control the timing of the ignition.

Yet another object of the present invention is to provide an improved ignition system which uniquely provides cylinder identification and ignition trigger signals, and which includes a computing means for varying the timing of the trigger signals as a function of operating characteristics of the engine.

Other objects and advantages will become apparent upon reading the following detailed description while referring to the attached drawings, in which:

FIG. 1 is a cutaway view showing details of the pickup of the present invention;

FIG. 2 is a combined pictorial diagram and block diagram of the apparatus of the present invention;

FIG. 3 is a detailed circuit diagram of a circuit for the practice of the present invention;

FIG. 4 is a flow chart of the operation of the microprocessor unit of FIG. 2 during startup; and, FIG. 5 is a flow chart of the operation of the microprocessor unit of FIG. 2 during operation.

DETAILED DESCRIPTION

Figure 5:
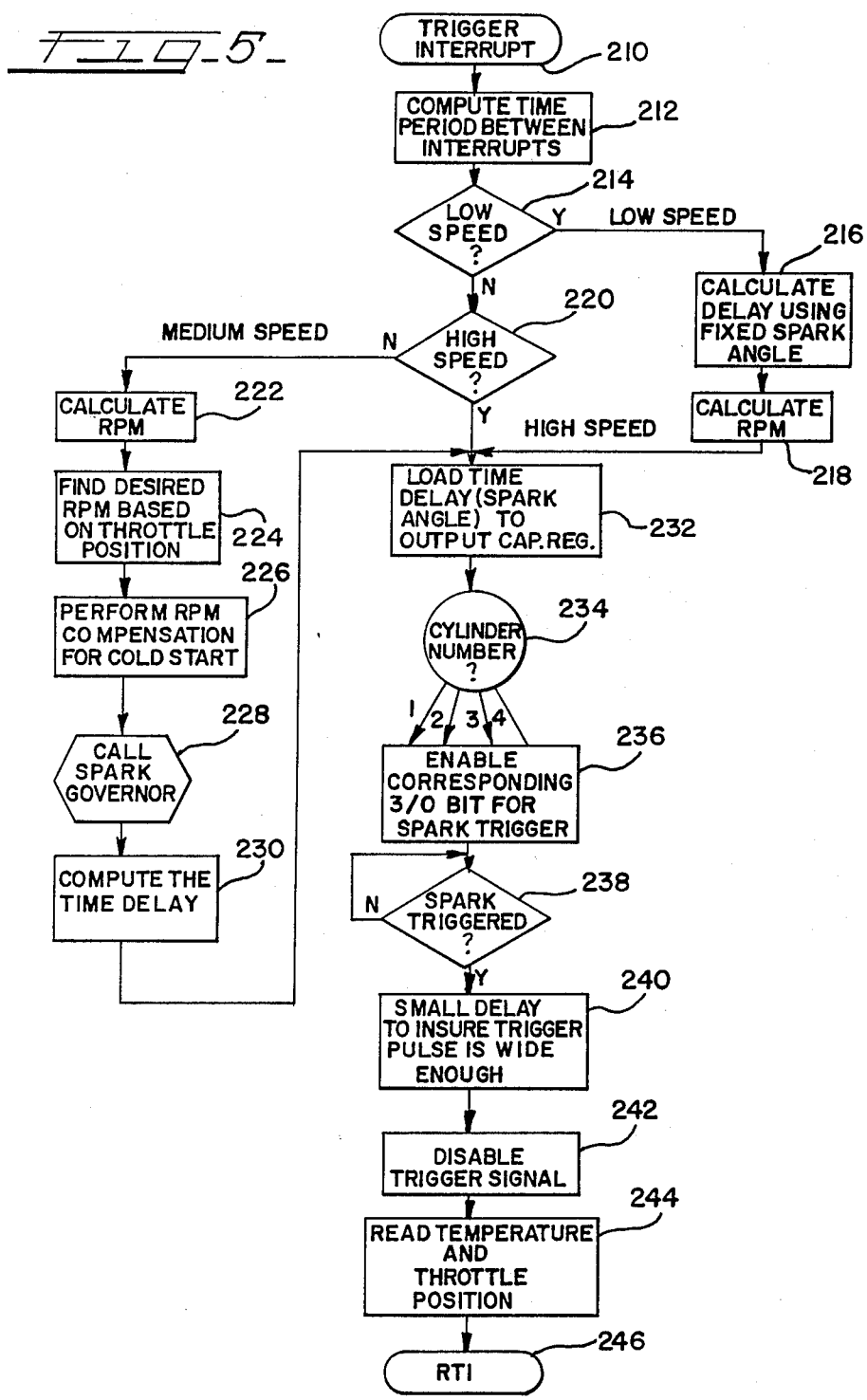

Broadly stated, the present invention is directed to a trigger system for spark-fired internal combustion engines. It comprises a plurality of magnets mounted in a structure that rotates in a timed relationship with the engine. The number of magnets is equal to the number of cylinders of the engine. If the engine has a two-stroke cycle, then, in the preferred embodiment, there is one magnet per cylinder, spaced equally about the periphery of the flywheel or other device that rotates in synchronism with the crankshaft of the engine. If the engine has a four-stroke cycle, then in the preferred embodiment a number of magnets equal to the number of cylinders is spaced equally about the periphery of a wheel connected to the camshaft to rotate at a speed half that of the crankshaft and in timed relationship with the crankshaft.

All of the magnets except one have the same pole face exposed to couple inductively with a sensing coil, while one magnet has an exposed pole of the opposite polarity. The sensing coil is doubly wound and the resulting two coils are connected in opposite senses. The outputs of the two coils are taken to a decoding unit, the output of which consists of one pulse per magnet regardless of the polarity of the magnet. One input to the decoding unit also produces one pulse for each revolution of the rotating device. This pulse identifies cylinder number one to maintain timing of the sparks. The other input to the decoding unit is a pulse once per revolution for every cylinder but number one. The pulse identifying cylinder number one can also be counted to provide a tachometer input. Both the output of the decoding unit and the input identifying cylinder number one are taken as inputs to a computing means which controls the sparks to a plurality of cylinders, based upon the identification of the timing of cylinder number one. The computing means also varies the timing of the sparks as a function of the operating characteristics of the engine, which are monitored and supplied to the computing means.

Turning now to the drawings, FIG. 1 is a cutaway view showing details of the pickup portion of the present invention. In FIG. 1, a ring gear 10 rotates in the direction of an arrow 12. This assumes that the engine operates on a two-stroke cycle. If it operates on a four-stroke cycle, the ring gear 10 would be replaced by a wheel that could be driven by the camshaft at half the rate of the crankshaft. Instead of the ring gear 10, the flywheel or other component rotating with the crankshaft could be used for a two-stroke engine.

A magnet 14 is one of a plurality of magnets exposed at or near the periphery of the ring gear 10. The magnet 14 moves with the ring gear 10 to pass in close proximity to a housing 16 which is shown partially cut away. A preferably U-shaped ferromagnetic core 18 having a coil 20 wound thereon is mounted in the housing 16. The coil 20 is preferably a bifilar winding made by winding two wires together. These two wires comprise a first winding 22 and a second winding 24. When one magnet 14 is moved past the core 18 by rotation of the ring gear 10 in the direction of the arrow 12, the core 14 first carries magnetic flux in one direction and then in the other. The changes in direction of the flux in the core 14 induce a voltage in the windings 22 and 24. The effects of this are best shown in FIG. 2 in which the ring gear 10 is shown from along an axis of rotation. The core 18 is disposed in close proximity to the magnet 14 which rotates a pole of a particular polarity, here a north pole, past the core 18. The flywheel 10 is set up to supply sparks for a four-cylinder two-cycle engine. As a result, the magnets 30, 32, and 34, together with the magnet 14, comprise a total of four magnets, one per cylinder. The magnets 30 through 34 have poles that are exposed to the core 18 in a polarity opposite to that of the magnet 14 when they are rotated past it. Thus, in FIG. 1, the magnets 30–34 couple south poles to the core 18. They will therefore develop pulses with a polarity opposite to that generated by the magnet 14 in any particular coil in proximity thereto. The magnet 14 produces signals of a polarity that is different from those produced by the magnets 30, 32, and 34.

The first winding 22 is connected at one end to a line 40 and is grounded at the other end. The second winding 24 is connected in an opposite sense to a line 42. The lines 40 and 42 are taken to a logic and controller section 44, which includes a decoder 46 that receives the signals on the lines 40 and 42. The decoder 46 also receives inputs from comparators 48, which receive external signals corresponding to engine temperature and throttle position. Other inputs could be taken to the comparators 48 if desired.

The decoder 46 produces inputs to a computing means which preferably comprises a microprocessing unit 50, which controls operation of the ignition system. The microprocessing unit 50 produces outputs that are taken to a diagnostic data port 52. Examples of such outputs include engine speed, engine temperature, ignition angle, and the like.

A plurality of outputs directing the firing of spark plugs in the engine is taken from the microprocessing unit 50 to an opto-coupler 54. The microprocessing unit 50, the opto-coupler 54, and the other electronic elements in the logic and controller section 44 are powered from a power supply 56 that in turn is powered from the alternator or other electrical supply of the engine that is being controlled. The power supply 56 could equally as well be supplied from an external source. The opto-coupler 54 provides electrical isolation between the logic and controller section 44 and an ignition section 58, which includes an ignition circuit 60 that delivers a properly timed spark to each spark plug of the engine that is being controlled.

The detailed circuitry which corresponds to the block diagram of FIG. 2 is illustrated in FIG. 3. An input is applied via the line 40 to a buffer amplifier 70 each time a signal is received which indicates the passage of the magnet identifying cylinder 1. The first winding 22 (see FIG. 1) is connected to the line 40 and is grounded through a diode 72 and an RC network 74. The diode 72 limits the input to the buffer amplifier 70 to a positive-going signal, and the RC network 74 makes the voltage at the line 40 substantially independent of the speed of rotation of the ring gear 10 (FIGS. 1 and 2).

The output of the buffer-amplifier 70 of FIG. 3 is applied to an OR gate 76, the output of which supplies one input of an AND gate 78. The OR gate 76 receives as a second input a signal from the microprocessing unit 50 on a line P36. Similarly, the line 42 which couples a signal from the second winding 24 of FIG. 1 is taken to a buffer amplifier 80. The second winding 24 is grounded through a diode 82 and the RC network 74. This insures that the buffer amplifier 80 responds only to positive pulses, and that the magnitude of these pulses is substantially independent of engine speed. The output of the buffer amplifier 8 is taken to an OR gate 84, the output of which is taken as a second input to the AND gate 78. The OR gate 84 receives as a second input a signal from the microprocessing unit 50 on a line P37. The connection of the OR gates 76 and 84, together with the enabling inputs from the microprocessing unit 50, and the AND gate 78, is effectively an OR gate on the signals from the windings 22 and 24 of FIG. 1, producing on a line 88 a negative-going pulse for each passage of one of the magnets 14, 30, 32 and 34 of FIG. 1. At the same time, a negative-going signal corresponding to the passage of the magnet 14 that identifies cylinder number 1 is available on a line 90 which connects a signal timed with the passage of a magnet 14 of FIG. 1 to the microprocessing unit 50 also identified as a line P11. A similar output corresponding to signals from cylinders 2, 3 and 4 is available on a line 92 as an output from the buffer amplifier 80. The line 92 is also connected to the microprocessing unit 50 at a line P24. The availability of the signals on the lines 90 and 92 enables the OR gates 76 and 84 to be gated in proper times to pass signals identifying the timing sequence of the engine.

The table is a Truth Table showing the operation of the parts of the decoder 46 that are associated with the identification and timing of the sparks. Inputs showing logical ones at the terminals 40 and 42 represent passage of magnets identifying cylinder 1 and cylinders 2, 3 and 4 respectively. These inputs are inverted in the buffer amplifiers 70 and 80 to produce logical 0's at P11 which is the line 90, for cylinder No. 1, and at P24, which is the line 92, for cylinders No. 2, 3 and 4. A sparktiming output of the AND gate 78 is represented by a logical 0 on the line 88, which is also referred to as negative-going logic. The Table shows logic for (a) an initial condition, before identification of cylinder 1 and without ignition pulses; (b) receipt of a pulse from cylinders 2, 3 or 4 before identification of cylinder 1; (c) receipt of the first pulse from cylinder 1; and (d) receipt of a pulse from cylinder 2, 3 or 4 after cylinder 1 has been identified. A do-not-care condition is identified as DNC.

TABLE

Truth Table For The Decoder 46 Of FIG. 3

| | P11 CYL #1 | P36 Enable | 76 Out | P24 CYL #2, 3, 4 | P37 Enable | 84 Out | Line 88 |
| --- | --- | --- | --- | --- | --- | --- | --- |
| (a) | 1 | DNC | 1 | 1 | DNC | 1 | 1 |
| (b) | 1 | DNC | 1 | 0 | 1 | 1 | 1 |
| (c) | 0 | 0 | 0 | 1 | DNC | 1 | 0 |
| (d) | 1 | DNC | 1 | 0 | 0 | 0 | 0 |

The magnets 10, 30, 32 and 34 are preferably located to produce pulses at times earlier than the maximum amount of spark advance desired of the engine, so that desired timing is achieved by varying the delay from those times. In the preferred embodiment, they produced pulses at approximately 26° before top dead center. This allowed the spark to be advanced to approximately 24° and to be advanced to any value.

Information about various engine parameters is supplied to the microprocessing unit 50 by circuitry shown in the left portion of FIG. 3 that operates as follows. A transistor 100 is controlled by a signal from the microprocessing unit 50 on a line P14 to connect a five-volt source to the voltage divider consisting of two series connected resistors 102 and 104. The divided voltage from the resistors 102 and 104 supplies a reference voltage to the negative input of a comparator 106 and a reference voltage to the negative input of a comparator 108. The comparator 106 receives a signal from the junction of a capacitor 110 and a thermistor 112 at its positive input. The thermistor 112 is located to be responsive to engine temperature. The capacitor 110 is initially discharged and the comparison signal applied to the positive input of the comparator 106 is initially zero. When the transistor 100 is enabled by the signal from the microprocessing unit 50, the capacitor 110 begins to charge at a rate that is determined by the RC time constant of the circuit, which is a function of the value of the resistance of the thermistor 112. The output of the comparator 106, which is taken at a fixed time after the beginning of the charging of the capacitor 110, provides a measure of engine temperature.

The comparator 108 receives a signal produced at the junction of a resistor 114 and an inductor 116 at its positive input. The inductor 116 is so placed as to have its inductance varied as a function of throttle position, as by inserting a ferromagnetic slug in the throttle linkage or the like. As a result, the output of the comparator 108 provides a measure of the throttle setting of the engine. The output of the comparator 106 is applied to a NAND gate 118, where it is gated by a signal from the microprocessing unit 50 on a line P12. The output of the NAND gate 118 is applied to an AND gate 120. Similarly, the output of the comparator 108 is gated by a NAND gate 122 in response to a signal from the microprocessing unit 50 on a line P13 and the output of the NAND gate 122 is applied as a second input to the AND gate 120. The output of the AND gate 120 and of the OR gate represented by the combination of the OR gates 76 and 84 and the AND gate 78 are applied as inputs to a NAND gate 124. The output of the NAND gate 124 is applied to a NAND gate 126, where it is gated by a signal from the microprocessing unit 50 on a line P10. The output of the NAND gate 126 is an electrical signal that comprises, at appropriately defined times, negative-going signals corresponding to a spark timing pulse for each cylinder and signals producing comparator outputs at times that can be counted to enable the determination of engine temperature and a throttle position.

The diagnostic data port 52 of FIG. 3 includes a dual operational amplifier 130 that produces at a terminal 132 signal that is proportional to engine speed and at a terminal 134 a signal that can be programmed to provide engine temperature, throttle position, or other information descriptive of engine performance. A shift interrupt terminal 136 provides a signal to the microprocessing unit 50 to instruct the generation of a signal that interrupts the spark and thereby reduces engine torque when a shift lever is engaged. In the preferred embodiment, this is accomplished by inhibiting the generation of several consecutive sparks, e.g., within the range of about 5 to about 50, in response to such a signal being produced. In the alternative, the spark may be retarded to reduce the speed to approximately 600 rpm. This makes it easier to shift the gears of an outboard marine engine. The signal is obtained from switches such as those shown in U.S. Pat. Nos. 4,262,622 and 4,403,970, assigned to the assignee of the present invention and incorporated here by reference as if set forth fully. A terminal 138 applies a ground or other appropriate voltage through a diode 140 to produce a signal that is applied through a buffer 142 to reset the microprocessing unit 50 on power-up. When the ignition switch is turned off, the five-volt signal from the power supply 56 disables the microprocessor 50 and thereby cuts off a spark being applied to the engine.

Output signals from the microprocessing unit 50 are taken to a plurality of drivers 144, each of which drives one of a plurality of silicon-controlled rectifiers (SCRs) 154, 156, 158 and 160, respectively. Each SCR 154, 156, 158 or 160 drives the coil associated with respective individual spark plugs. Operation of the driver 144 is controlled by an inverting NAND gate 162 that gates the operating voltage to each operating element of the driver 144. The operating voltage for the spark plugs and coils is supplied by a diode bridge 164 that is electrically isolated from the electronic of FIG. 3 by the optical isolators 146, 148, 150, and 152. A plurality of data lines 166 from the microprocessing unit 50 can be used to operate the ignition system of an engine in conjunction with other elements, such as a fuel injection system or the like.

The circuit as described is illustrative of one embodiment of the invention that has been built and operated successfully. It should be understood that the invention is not limited to an engine of four cylinders, but is readily adaptable to engines having any number of cylinders greater than one. It has already been explained that the invention is especially adaptable to a two-stroke outboard marine engine or to a four-stroke engine in a number of ways. Preferably, the two-stroke engine has magnets placed in the flywheel or ring gear or other rotating part connected to the crankshaft, while a four-stroke engine is preferably timed from a camshaft or other device rotating at half the speed of the crankshaft. It is obvious that the invention is readily adapted to electronic ignition systems of more complexity, in which the timing of the spark may be varied electronically in response to variables other than speed, engine temperature, and the throttle position.

A flow chart of the operation of the microprocessing unit 50 during startup is illustrated in FIG. 4. A start block 180 calls an initialization routine, block 182, which selects comparison parameters from memory and sets initial values on input and output ports. A block 184 then calls for reading of initial engine temperature and block 186 calls for a reading of throttle position. The decision block 188 next looks to see if the microprocessing unit has received a signal from a first cylinder. Referring to FIG. 3, this is a test for a signal on the line 90, which is taken directly as an input to the microprocessor 50. If the decision block 188 of FIG. 4 does not find a first-cylinder signal, operation is cycled to continue looking. When a first-cylinder signal is detected, a block 190 sets a cylinder flag signal to one. A decision block 192 next tests to see if the engine has stalled. If it has, control is returned to the block 186 to repeat the sequence. If the engine has not stalled, a decision block 194 tests to see if the throttle position exceeds the high limit. If it does, a block 196 sets the high-speed flag signal and directs operation to a block 198. This calls for the microprocessing unit 50 to enter a look-up table to determine the proper spark angle associated with the throttle position. If the throttle position is not above the high limit, a decision block 200 tests to see whether the speed is below the lower limit. If it is, a block 202 sets a low-speed flag signal. This calls for a predetermined spark angle associated with low-speed operation and the temperature as determined in the block 184. If the speed is not less than the lower limit, a decision block 204 sets a medium-speed flag signal, operation then reverts to the decision block 192, and the ensuing portion of the cycle is repeated.

A flow chart of the operation of the microprocessing unit 50 of FIG. 2 when the engine is running is illustrated in FIG. 5. A trigger interrupt block 210 indicates the reception at the microprocessing unit 50 of FIG. 2 of a signal generated by passage of one of the magnets 14, 30, 32 or 34 of FIG. 2. A block 212 directs the computation of the time period between interrupts, which is a measure of the engine speed. A decision block 214 next tests to see if the speed is low. This represents a period beyond some predetermined minimum as computed in the block 212. If the decision block 214 detects low speed, then a block 216 calculates the amount of time delay that corresponds to a fixed angle of retarded spark. A block 218 calculates the speed in RPM and control returns.

If the decision block 214 does not detect low speed, then a decision block 220 tests for high speed. This represents a time between triggers that is less than a predetermined value. If the decision block 220 does not find a high speed, control enters a medium-speed loop in which a block 220 calculates the speed in RPM from the trigger intervals. A block 224 calculates a desired speed that is associated with a detected throttle position. The block 226 corrects the desired speed value if the engine temperature is cold. A block 228 then calls a spark governor, and a block 230 calculates the time delay from the trigger interrupt that is appropriate for the throttle position, cold correction, and any other adjustments that are necessary in setting the spark timing.

Regardless of the speed range, control passes next to a block 232 which loads the selected time delay corresponding to the angle of advance or retard at a particular speed. Selection of the proper cylinder is then indicated in circle 234. As indicated earlier, this is done by identifying cylinder number 1 once per revolution of the engine, and counting in sequence to identify the succeeding cylinders as additional input pulses are received. Thus, a block 236 indicates symbolically the receipt of four inputs identifying four different cylinders. The block 236 directs the enabling of a bit corresponding to the appropriate cylinder to direct a spark to that cylinder. A decision block 238 next tests to see if a spark has been triggered. If it has not, control loops to the decision block 238, deferring further action until the spark has been triggered. Upon an indication that a spark has been triggered, a block 240 directs the insertion of a delay to ensure that the trigger pulse is wide enough to trigger the ignition circuit. A block 242 then disables the trigger signal. A block 244 directs the reading of the engine temperature and the throttle position, and the cycle repeats with the next succeeding trigger pulse.

The present invention is particularly adapted for application with outboard marine engines, many of which are operated in two-stroke cycles. Adequate control of such engines is normally achieved by supplying inputs corresponding to engine speed, throttle position, and engine temperature, and the circuit of FIG. 3 is shown as responding to these inputs. It should be evident that other inputs such as manifold vacuum or the like could be set up to produce inputs to the microprocessing unit 50 of FIG. 3 to assist in controlling the spark angle for optimum operation. Reference has also been made to the fact that the present invention could be applied to a two-stroke engine or to a four-stroke engine. When it is applied to a two-stroke engine, the firing order is typically the same as the order of physical placement of cylinders. This is not necessarily the case, and it should be evident from an inspection of FIG. 3 that any firing sequence could be achieved by varying the sequence of connections to or from the opto-couplers 146, 148, 150 and 152. If the present invention is applied to control an engine having a four-stroke cycle, the firing order will normally be different from the geometrical order of the cylinders, and such a varied connection will be necessary. It has been pointed out above that an engine having a four-stroke cycle is best controlled by the circuit of the present invention by placing the magnets 14, 30, 32 and 34 in a rotating component that turns at half the rotating frequency of the crank shaft of the engine. This is typically the timing of the cam shaft of an engine having a four-stroke cycle.

The serial operation of the spark timing shown here has advantages when a microprocessing unit is used as here to control an engine. For example, it permits the use of the single port P20 of FIG. 3 for the serial input of data identifying spark timing, engine temperature, and throttle position. This facilitates the counting of adjacent spark timing pulses to determine engine speed, which in turn determines desired ranges of spark timing. The use of a microprocessor also permits the inhibition or dropping of several consecutive sparks to create a zero-torque interval for shifting into gear. Other features could readily be programmed in the microprocessing unit beyond those shown and described.

The description of specific embodiments of the present invention is intended to set forth the best mode known to the inventors for the practice of the invention. It should be taken as illustrative and not as limiting and the scope of the invention should be limited only by the appended claims.

What is claimed is:

1. An apparatus for generating ignition trigger and synchronizing signals in a spark-ignited internal-combustion engine having a plurality of cylinders and having a ring gear rotating in timed relationship with the crankshaft of the engine, the apparatus comprising:
    a plurality of magnets equal in number to the number of cylinders, the magnets being disposed equally spaced on a circle coaxial with the ring gear, one of the plurality having an exposed pole of a first polarity and each of the others of the plurality having an exposed pole of a second polarity opposite to the first polarity;
    a first coil disposed near the ring gear so as to be inductively coupled to the magnets upon rotation of the ring gear and generate a signal of a first polarity in response to motion of the pole of the first polarity past the first coil;
    a second coil disposed near the ring gear and near the first coil so as to be inductively coupled to the magnets upon rotation of the ring gear and generate a signal of the first polarity in response to motion of each of the poles of the second polarity past the second coil; and
    a decoder connected to the first and second coils and receiving as inputs the signals of the first polarity from the first and second coils and producing output signals representing the logical sum of the signals of the first polarity, whereby the signal of the first polarity in the first coil produces a synchronizing output signal and also a predetermined cylinder identifying output signal, said output signals also providing ignition trigger signals for each cylinder.

2. The apparatus of claim 1 further comprising a ferromagnetic core on which the first and second coils are disposed, said magnets and said ferromagnetic core being disposed near the periphery of the ring gear so that the core is exposed to a change in magnetic flux upon passage of the magnets when the ring gear is rotated.

3. The apparatus of claim 2 wherein the first and second coils are bifilar wound on the ferromagnetic core, the first and second cores being grounded at opposite ends.

4. The apparatus of claim 3 further comprising a pair of diodes, each of the diodes being connected to respective ones of the first and second coils in a sense to prevent passage of a signal opposite in sense to the signal of the first polarity and each of the diodes being connected to ground through an RC network.

5. An apparatus for timing sparks in a spark-fired internal combustion engine having a flywheel that rotates about an axis, the apparatus comprising:
    a plurality of magnets disposed on the flywheel near a periphery of the flywheel and equally spaced on a circle in a plane perpendicular to the axis and centered on the axis, a first one of the plurality having a pole of a first polarity oriented in a first direction with respect to the circle, and the remainder of the plurality each having a pole of second polarity opposite to the first polarity oriented in the first direction;
    a first coil disposed near the flywheel and positioned to be inductively coupled with each of the plurality of magnets when the flywheel rotates, the first coil producing a first voltage pulse at a first terminal with a first sense in response to inductive coupling with the first one of the plurality of magnets, and the first coil producing a second voltage pulse at the first terminal with a second sense opposite to said first sense in response to the remainder of the plurality of magnets, the first pulse occurring once per rotation of the flywheel;
    a second coil disposed near the flywheel and near the first coil and positioned to be inductively coupled with each of the plurality of magnets when the flywheel rotates and at substantially the same time as the inductive coupling of the first coil with a plurality of magnets, the second coil producing a second voltage at a second terminal that is opposite in sense to the sense of the first voltage at the first terminal;
    a decoder connected to the first and second terminals to combine logically the voltages at the first and second terminals to produce an output pulse as each one of the polarity of magnets passes the first and second coils, whereby the first pulse identifies a particular cylinder and the output pulses from the decoder identify a time to fire a spark for each one of the cylinders of the internal combustion engine.

6. The apparatus of claim 5 wherein the first direction is perpendicular to the axis.

7. The apparatus of claim 5 wherein the first direction is parallel to the axis.

8. The apparatus of claim 5 wherein the first direction is at a predetermined angle to the axis.

9. The apparatus of claim 5 wherein the first coil and the second coil are wound on a ferromagnetic core disposed in proximity to the flywheel so that rotation of the flywheel passes each of the magnets near the ferromagnet core to change magnetic flux in the core and thereby induce a voltage in the first and second coils.

10. The apparatus of claim 5 wherein the first coil and the second coil are wound together as a bifilar coil.

11. The apparatus of claim 5 wherein the decoder is connected to a computing unit to supply a serial stream of pulses associated with firing times of cylinders and also a pulse identifying a pulse in the serial stream that represents a particular cylinder.

12. The apparatus of claim 11 wherein the microprocessing unit provides as outputs a timed signal directing the firing of each of a plurality of spark plugs at a rate and time controlled by the microprocessing unit.

13. An apparatus for generating ignition trigger and synchronizing signals in a capacitive discharge ignition system for an internal combustion engine having a plurality of cylinders each of which has a reciprocating piston, said engine having a ring gear rotating in timed relationship with the crankshaft of the engine, each of said pistons having a top dead center position which represents the reference position for determining the timing of the spark ignition, the top dead center position being in timed relation with the angular orientation of said ring gear, the apparatus comprising:
- a plurality of magnets equal in number to the number of cylinders being attached to the ring gear equally spaced on a circle coaxial therewith, one of the plurality having an exposed pole of a first polarity and each of the others of the plurality having an exposed pole of an opposite polarity;
- a first coil disposed near the ring gear so as to be inductively coupled to the magnets upon rotation of the ring gear and generate signal of a first polarity in response to motion of the pole of the first polarity past the first coil;
- a second coil disposed near the ring gear and near the first coil so as to be inductively coupled to the magnets upon rotation of the ring gear and generate a signal of the first polarity in response to motion of each of the poles of opposite polarity past the second coil;
- decoding means connected to the first and second coils and receiving as inputs the signals of the first polarity from the first and second coils and producing output signals representing the logical sum of the signals of the first polarity, whereby the signal of the first polarity in the first coil produces a synchronizing output signal and also a predetermined cylinder identifying output signal, said output signals also providing trigger signals for each cylinder;
- means for respectively providing sparks to each of said cylinders in response to receiving ignition trigger signals applied thereto;
- means for providing signals indicative of the operating characteristics of the engine;
- computing means adapted to receive said operating characteristics signals and said trigger signals and generate ignition trigger signals that have a timing characteristic relative to the timing of said trigger signals which are changed as a function of the value of said operating characteristics.

14. A system as defined in claim 13 wherein said computing means inhibits the generation of said ignition trigger signals for a predetermined time in response to receiving an operating characteristic signal indicating that the engine is being shifted into a different gear.

15. A system as defined in claim 13 wherein said operating characteristics signals include signals which are indicative of the throttle setting of the engine.

16. A system as defined in claim 13 wherein said operating characteristics signals include signals which are indicative of the temperature of the engine.

17. A system as defined in claim 13 wherein said operating characteristics signals include signals which are indicative of the operating speed of the engine.

18. A system as defined in claim 13 wherein said computing means produces an ignition trigger signal that has a predetermined timing characteristic that corresponds to an angular position that is approximately 26 degrees before the angular position of said ring gear that corresponds to the top dead center position of a particular piston, in the absence of any change of the timing of the ignition trigger signal as a function of operating characteristics signals.

19. A system as defined in claim 18 wherein said computing means reduces said predetermined timing characteristic in direct proportion to an operating characteristic signal indicative of the temperature of the engine.

20. A system as defined in claim 18 wherein said computing means reduces said predetermined timing characteristic in direct proportion to an operating characteristic signal indicative of the speed of the engine.

21. An apparatus for generating ignition, trigger and synchronizing signals in a spark-ignited internal-combustion engine having a plurality of cylinders and having wheel means rotating in timed relationship with the crankshaft of the engine, the apparatus comprising:
- means for generating a first signal associated in time with a first cylinder;
- means for generating a second signal associated in time with a second cylinder;
- means for processing the first and second signals to provide substantially identical signals associated in time with the first and second cylinders; and
- means responsive to the first signal for identify one of the substantially identical signals with a first cylinder to produce a first-cylinder signal.

22. The apparatus of claim 21 comprising in addition a microprocessor connected to the means for combining and to the means for identifying, the microprocessor producing a first output controlling a spark at the first cylinder and a second output controlling a spark at the second cylinder.

23. The apparatus of claim 22 wherein the microprocessor is adapted to control spark timing with respect to top dead center in response to a sensor input.

24. The apparatus of claim 23 wherein the sensor input is a function of throttle position.

25. The apparatus of claim 23 wherein the sensor input is a function of engine temperature 26. The apparatus of claim 22 wherein the microprocessor is adapted to modify a spark at the first and second cylinders in response to an input indicating that a gear change is being made.

27. The apparatus of claim 21 wherein the means for generating a second signal is associated in time with each of a second, third, and fourth cylinders.

28. The apparatus of claim 27 wherein the means for processing the first and second signals provides substantially identical signals associated in time with third and fourth cylinders.

29. The apparatus of claim 28 comprising in addition a microprocessor connected to the means for processing and to the means for identifying the microprocessor producing a first output controlling a spark at the first cylinder, a second output controlling a spark at the second cylinder, a third output controlling a spark at the third cylinder and a fourth output controlling a spark at the fourth cylinder.

30. The apparatus of claim 29 wherein the microprocessor is adapted to control timing of the spark at each of the first, second, third and fourth cylinders with respect to top dead center in response to a sensor input.

31. The apparatus of claim 30 wherein the sensor input is a function of throttle position.

32. The apparatus of claim 30 wherein the sensor input is a function of engine temperature.

33. The apparatus of claim 28 wherein the microprocessor is adapted to modify a spark at each of the first, second, third and fourth cylinders in response to an input indicating that a gear change is being made.

* * * * *

UNITED STATES PATENT AND TRADEMARK OFFICE
CERTIFICATE OF CORRECTION

PATENT NO.  : 4,852,536
DATED       : August 1, 1989
INVENTOR(S) : Maier et al.

It is certified that error appears in the above-identified patent and that said Letters Patent is hereby corrected as shown below: Title Page:

In the Abstract, line 16, change "cylider" to --cylinder--.

Column 1, line 42, change "flywheel" to --Flywheel--.

Column 1, line 57, change "alteration" to --alternation--.

Column 2, line 15, change "With" to --with--.

Column 2, line 23, change "Associated" to --associated--.

Column 2, line 46, change "as" to --is--.

Column 5, line 8, change "8" to --80--.

Column 5, line 37, change "P11" to --P11--.

Column 5, line 39, change "sparktiming" to --spark-timing--.

Column 7, lines 20-21, after "electronic" insert --portions of the circuit--.

Column 8, line 14, change "!4" to --14--.

Column 12, line 34, delete ",".

Signed and Sealed this

Nineteenth Day of June, 1990

Attest:

HARRY F. MANBECK, JR.

Attesting Officer

Commissioner of Patents and Trademarks